(12) United States Patent
Berry et al.

(10) Patent No.: US 10,999,700 B2
(45) Date of Patent: May 4, 2021

(54) COMMUNICATION ELEMENTS, COMMUNICATION SYSTEMS, TIME-OF-USE TRACKING ELEMENTS, METHODS OF COMMUNICATING, AND METHODS OF CONTROLLING COMMUNICATION OF INFORMATION REGARDING ASSETS

(71) Applicant: MARQUARDT GMBH, Rietheim-Weilheim (DE)

(72) Inventors: Christopher Berry, Manlius, NY (US); Stephen McMahon, Homer, NY (US); Keith Chaston, Dubuque, IA (US)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 16/649,415

(22) PCT Filed: Oct. 3, 2018

(86) PCT No.: PCT/US2018/054140
§ 371 (c)(1),
(2) Date: Mar. 20, 2020

(87) PCT Pub. No.: WO2019/070837
PCT Pub. Date: Apr. 11, 2019

(65) Prior Publication Data
US 2020/0288272 A1    Sep. 10, 2020

Related U.S. Application Data

(60) Provisional application No. 62/567,370, filed on Oct. 3, 2017.

(51) Int. Cl.
*H04W 4/02*    (2018.01)
*G06Q 50/28*    (2012.01)
(Continued)

(52) U.S. Cl.
CPC ............ *H04W 4/027* (2013.01); *G06Q 50/28* (2013.01); *G07C 1/02* (2013.01); *H04W 12/04* (2013.01); *H04W 12/06* (2013.01); *H04W 72/04* (2013.01)

(58) Field of Classification Search
CPC ....... H04W 12/06; H04W 12/08; H04W 4/70; H04W 4/80; H04W 12/04; H04W 12/0401; H04L 2209/805
See application file for complete search history.

(56) References Cited

U.S. PATENT DOCUMENTS 6,735,630 B1    5/2004 Gelvin et al.
6,774,797 B2    8/2004 Freathy et al.
(Continued)

OTHER PUBLICATIONS

International Search Report and Written Opinion (Application No. PCT/US2018/054140) dated Jan. 18, 2019.
(Continued)

*Primary Examiner* — Nam T Huynh
(74) *Attorney, Agent, or Firm* — Burr & Brown, PLLC

(57) ABSTRACT

A communication element, comprising a communication element transceiver, a sensor (configured to detect jerking motion), and an electronic storage device, the communication element configured to: [A] repeat a sequence comprising a broadcast mode in which is sends broadcast signals followed by a sleep mode in which it does not send any broadcast signal, [B] discontinue the sequence and enter a communication mode (in which stored information regarding an asset, e.g., a heavy-duty attachment, is transmitted to a controller, e.g., in a heavy-duty vehicle, upon request) upon receiving (during the broadcast mode or within a set time span after detecting a jerking motion). Also, communication systems comprising one or more such communication elements and one or more controllers, and methods of broadcasting and, upon specific conditions being met, com-
(Continued)

municating. Also, an element for cumulatively tracking time that an element has been in use.

19 Claims, 6 Drawing Sheets

(51) Int. Cl.
    *G07C 1/02*     (2006.01)
    *H04W 12/04*     (2021.01)
    *H04W 12/06*     (2021.01)
    *H04W 72/04*     (2009.01)

(56) References Cited

U.S. PATENT DOCUMENTS

| | | |
|---|---|---|
| 6,900,732 B2 | 5/2005 | Richards |
| 6,917,300 B2 | 7/2005 | Allen |
| 6,975,222 B2 | 12/2005 | Krishan et al. |
| 6,998,985 B2 | 2/2006 | Reisman et al. |
| 8,223,009 B2 | 7/2012 | Anderson et al. |
| 8,457,622 B2 | 6/2013 | Wesby |
| 9,041,561 B2 | 5/2015 | Wallace et al. |
| 9,299,247 B2 | 3/2016 | O'Neal et al. |
| 9,888,300 B2 | 2/2018 | Stampfl et al. |
| 10,002,360 B2 | 6/2018 | Atkinson et al. |
| 10,121,028 B2 | 11/2018 | Sengstaken, Jr. |
| 2004/0178955 A1 | 9/2004 | Menache et al. |
| 2012/0220893 A1 | 8/2012 | Benzel et al. |
| 2012/0223833 A1 | 9/2012 | Thomas et al. |
| 2012/0323474 A1 | 12/2012 | Breed et al. |
| 2014/0300739 A1 | 10/2014 | Mimar |
| 2016/0217433 A1 | 7/2016 | Walton et al. |
| 2017/0041744 A1 | 2/2017 | McKay |
| 2017/0124836 A1 | 5/2017 | Chung et al. |
| 2017/0156662 A1 | 6/2017 | Goodall et al. |
| 2018/0025603 A1 | 1/2018 | Tyler et al. |

OTHER PUBLICATIONS

International Preliminary Report on Patentability (Chapter I)(Application No. PCT/US2018/054140) dated Apr. 8, 2020.

COMMUNICATION ELEMENTS, COMMUNICATION SYSTEMS, TIME-OF-USE TRACKING ELEMENTS, METHODS OF COMMUNICATING, AND METHODS OF CONTROLLING COMMUNICATION OF INFORMATION REGARDING ASSETS

CROSS-REFERENCE TO RELATED APPLICATIONS

This application claims the benefit under 35 U.S.C. 119 section (e) of U.S. Provisional Patent Application No. 62/567,370, filed Oct. 3, 2017, the entirety of which is incorporated herein by reference.

FIELD OF THE INVENTIVE SUBJECT MATTER

The present inventive subject matter is directed to communication elements, communication systems, and methods of communicating. A communication element can comprise an electronic storage device that stores one or more authentic identification keys and/or one or more identification key validation rules, and information regarding one or more assets, and the communication element can be configured to communicate information regarding an asset to a controller that has transmitted a valid identification key, within a protocol for the timing of signals being sent and signals being received by the communication element, for establishing communication with a controller. The controller can be attached to a receiving element. In some embodiments of the present inventive subject matter, the receiving element can be a vehicle, and the controller can be contained in the vehicle.

BACKGROUND

There is an ongoing need for more efficient and reliable ways to control communication of information relating to all types of assets, e.g., equipment and products.

BRIEF SUMMARY OF THE INVENTIVE SUBJECT MATTER

The present inventive subject matter includes a wide variety of embodiments. By way of introduction to subject matter described herein, in accordance with one representative embodiment in accordance with an aspect of the present inventive subject matter, an inventory of assets (defined herein), such as attachments (e.g., heavy equipment attachments), and last known vicinity of such asserts, can be captured by a controller (defined herein), and optionally displayed on a display device associated with such controller by having the controller (e.g., a cellular phone) within the vicinity of the assets. Information regarding the assets can be transmitted from communication elements associated with each respective asset. A survey of the assets can be performed by driving through a construction site for instance.

In some embodiments, each of one or more communication elements is able to monitor motion of the assets(s) associated with the respective communication element, and such information can be used to determine (and/or update) the hours of operation for the asset. A sampling window is opened and motion status is reported during this window, providing the required accuracy while preserving battery life.

In some embodiments, when a communication element detects motion, the communication element can indicate to one or more controllers within the vicinity of the asset(s) associated with the communication element (e.g., an asset to which the communication element is attached) to provide to the controller (s) proximity information (i.e., location of the asset(s)). The controller can then display most likely devices near a user that would be suitable for an intended purpose and, if desired, establish communication through which information can be relayed.

By way of further introduction, in another representative embodiment in accordance with an aspect of the present inventive subject matter, one or more controllers (each, e.g., mounted in or on a heavy-duty vehicle) can be in range of one or more communication elements (each communication element, e.g., mounted on an asset, e.g., an attachment for a heavy-duty vehicle or a vehicle. Each of the communication elements is initially in a cycle consisting of repeating a sequence of (i) for a selectable period of time (i.e., the period of time can be selected, and, if desired, altered by a user) of a first duration (e.g., four seconds), the communication element repeatedly sends broadcast signals (including information relating to the attachment to which it is attached, such as the type of attachment, hours of use, that the attachment is currently in use, etc.), which can result in such information being displayed on a display element associated with the controller (e.g., viewable by an operator in a heavy-duty vehicle), the broadcast signals spaced a very short period of time (e.g., 100 milliseconds) from each other, and then (ii) going to a sleep mode for a selectable period of time of a second duration (e.g., four minutes). Going into sleep mode during such intervals (which can be much longer than the periods of broadcasting) helps preserve battery life for the communication elements. During periods of broadcasting, one or more of the controllers can connect to any or all of the communication elements by the controller issuing (e.g., at the direction of an operator in a heavy-duty vehicle) a request to connect (which may include identification information that the communication element(s) can analyze for validity). If connection is made in such a way, information about the assets (e.g., the attachments) can be communicated to the controller(s). In the event that a controller (e.g., at the direction of an operator in a heavy-duty vehicle) wishes to make a connection with a communication element associated with an asset without waiting until the next series of broadcast messages (i.e., without waiting the remainder of the four minute duration of a sleep mode), the asset can be caused to undergo a jerking motion (e.g., by bumping the asset with the vehicle), which prompts the communication element associated with that asset to transmit information (which can result in such information being displayed on a display element associated with the controller, e.g., viewable by an operator in a heavy-duty vehicle) for a selectable period of time (e.g., two minutes) at short intervals (e.g., spaced by about twenty-five milliseconds), during which time the controller can connect with the communication element in the manner described above (e.g., by the controller issuing a request to connect, which may include identification information that the communication element(s) can analyze for validity)(and if such a connection is not made during such period of time, the communication element can go back to the cycle described above (i.e., broadcasting followed by sleep mode)).

As described below, the present inventive subject matter includes many aspects, and the above descriptions are provided as an introduction (by way of specific examples) to the description that follows.

In accordance with a first aspect of the present inventive subject matter, there is provided a communication element, comprising:
a communication element transceiver,
a sensor, and
an electronic storage device,
the sensor configured to detect jerking motion,
the communication element configured to:
repeat a sequence comprising [1] sending from the communication element transceiver a series of broadcast signals during a time period of a first duration, followed by [2] not sending any broadcast signal from the communication element transceiver for a time period of a second duration,
discontinue said sequence if [a] during a time period during which the communication element transceiver sends a series of broadcast signals, the communication element transceiver receives from a controller a controller signal that comprises a valid identification key, or [b] any time during said sequence the sensor detects a jerking motion,
enter a mode in which the communication element performs any authorized functions requested by a first controller, if:
during a time period during which the communication element transceiver sends a series of broadcast signals, the communication element transceiver receives from the first controller a controller signal that comprises a valid identification key,
or
during a time period of a third duration starting immediately after the sensor detects a jerking motion, the communication element transceiver receives from the first controller a controller signal that comprises a valid identification key,
said authorized functions comprising communicating to the first controller information stored in the electronic storage device regarding an asset if such information is requested by the first controller,
and exit said mode in which the communication element performs any authorized functions requested by a first controller, and resume said repeating of said sequence if a time period of a fourth duration passes during which [A] the communication element transceiver does not receive any communication from the first controller and [B] the sensor does not detect any jerking motion.

In some embodiments in accordance with the first aspect of the present inventive subject matter, which can include or not include, as suitable, any of the other features described herein, at least one of the broadcast signals comprises at least some information regarding an asset.

In some embodiments in accordance with the first aspect of the present inventive subject matter, which can include or not include, as suitable, any of the other features described herein, the communication element is attached to an asset.

In some embodiments in accordance with the first aspect of the present inventive subject matter, which can include or not include, as suitable, any of the other features described herein, said authorized functions further comprise changing to a different communication channel if such change is requested by the controller.

In some embodiments in accordance with the first aspect of the present inventive subject matter, which can include or not include, as suitable, any of the other features described herein, the communication element is further configured to store data representing the total cumulative amount of time during which jerking motion is detected by the sensor (and in some of such embodiments, such data can be communicated in any way, e.g., by being transmitted via the communication element transceiver).

In some embodiments in accordance with the first aspect of the present inventive subject matter, which can include or not include, as suitable, any of the other features described herein, the communication element further comprises one or more energy sources, e.g., a battery.

In accordance with a second aspect of the present inventive subject matter, there is provided a communication system, comprising:
a communication element in accordance with the first aspect of the present inventive subject matter; and
a controller,
the controller comprising a controller transceiver,
the controller transceiver configured to:
transmit to the communication element a controller signal that comprises a valid identification key;
transmit to the communication element requests that the communication element transmit to the controller information stored in the electronic storage device regarding an asset, and receive from the communication element information stored in the electronic storage device regarding said asset.

In some embodiments in accordance with the second aspect of the present inventive subject matter, which can include or not include, as suitable, any of the other features described herein, the controller is also configured to request that the communication element change to a different communication channel.

In some embodiments in accordance with the second aspect of the present inventive subject matter, which can include or not include, as suitable, any of the other features described herein, the controller is attached to a receiving element (and in some cases, the receiving element is a vehicle, e.g., the controller is attached to a vehicle (and is in or on the vehicle)).

In some embodiments in accordance with the second aspect of the present inventive subject matter, which can include or not include, as suitable, any of the other features described herein:
the controller further comprises a display element, and
the controller is configured to display on the display element information received from the communication element regarding said asset.

In accordance with a third aspect of the present inventive subject matter, there is provided a communication system, comprising:
a communication element in accordance with the first aspect of the present inventive subject matter; and
a plurality of controllers,
each controller comprising a respective controller transceiver,
each controller transceiver configured to:
transmit to the communication element a respective controller signal that comprises a valid identification key; and
transmit to the communication element requests that the communication element transmit to the respective controller information stored in the electronic storage device regarding an asset, and receive from the communication element information stored in the electronic storage device regarding said asset.

In accordance with a fourth aspect of the present inventive subject matter, there is provided a communication system, comprising:
    a plurality of communication elements, each of said communication elements in accordance with the first aspect of the present inventive subject matter; and
    a controller,
    the controller comprising a controller transceiver,
    the controller transceiver configured to:
        transmit to at least some of the communication elements a controller signal that comprises a valid identification key; and
        transmit to at least some of the communication elements requests that the respective communication element transmit to the controller information stored in the respective electronic storage device regarding an asset, and receive from the respective communication element information stored in the respective electronic storage device regarding said asset.

In accordance with a fifth aspect of the present inventive subject matter, there is provided a communication system, comprising:
    a plurality of communication elements, each of said communication elements in accordance with the first aspect of the present inventive subject matter; and
    a plurality of controllers,
    each controller comprising a respective controller transceiver,
    each controller transceiver configured to:
        transmit to at least some of the communication elements a respective controller signal that comprises a valid identification key; and
        transmit to at least some of the communication elements requests that the respective communication element transmit to the respective controller information stored in the respective electronic storage device regarding an asset, and receive from the respective communication element information stored in the respective electronic storage device regarding said asset.

In accordance with a sixth aspect of the present inventive subject matter, there is provided a method, comprising:
    repeating a sequence comprising [1] sending from a communication element transceiver a series of broadcast signals during a time period of a first duration, followed by [2] not sending any broadcast signal from the communication element transceiver for a time period of a second duration,
    discontinuing said sequence upon [a] the communication element transceiver receiving from any controller a controller signal that comprises a valid identification key during a time period during which the communication element transceiver is sending a series of broadcast signals, or [b] a sensor that is attached to an asset detecting a jerking motion during said sequence,
    entering a mode in which the communication element performs at least one authorized function requested by a first controller, upon:
        the communication element transceiver receiving from the first controller a controller signal that comprises a valid identification key during a time period during which the communication element transceiver is sending a series of broadcast signals,
    or
        the communication element transceiver receiving from the first controller a controller signal that comprises a valid identification key during a time period of a third duration starting immediately after the sensor detecting a jerking motion,
    said authorized functions comprising communicating to the controller information stored in an electronic storage device regarding an asset upon such information being requested by the controller,
    and exiting said mode in which the communication element performs any authorized functions requested by a first controller, and resuming said repeating of said sequence upon passage of a time period of a fourth duration during which [A] the communication element transceiver does not receive any communication from the first controller and [B] the sensor does not detect any jerking motion.

In some embodiments in accordance with the sixth aspect of the present inventive subject matter, which can include or not include, as suitable, any of the other features described herein, at least one of the broadcast signals comprises at least some information regarding said asset.

In some embodiments in accordance with the sixth aspect of the present inventive subject matter, which can include or not include, as suitable, any of the other features described herein, the controller is attached to a receiving element (which, in some cases, is a vehicle, e.g., the controller is attached to a vehicle (and is in or on the vehicle)).

In some embodiments in accordance with the sixth aspect of the present inventive subject matter, which can include or not include, as suitable, any of the other features described herein:
    the controller further comprises a display element, and
    the method further comprises the controller displaying on the display element information received from the communication element regarding said asset.

In some embodiments in accordance with the sixth aspect of the present inventive subject matter, which can include or not include, as suitable, any of the other features described herein, said authorized functions further comprise changing to a different communication channel if such change is requested by the controller.

In accordance with a seventh aspect of the present inventive subject matter, there is provided a method, comprising:
    for each of a plurality of communication elements that each comprises a respective communication element transceiver, a respective sensor and a respective electronic storage device, repeating a sequence comprising [1] sending from the communication element transceiver a series of broadcast signals during a time period of a first duration, followed by [2] not sending any broadcast signal from the communication element transceiver for a time period of a second duration,
    for each communication element in a first group of the communication elements, discontinuing said sequence upon [a] the respective communication element transceiver receiving from any controller a controller signal that comprises a valid identification key during a time period during which the communication element transceiver is sending a series of broadcast signals, or [b] the respective sensor of the communication element detecting a jerking motion during said sequence, said first group comprising at least one of said plurality of communication elements,
    for each of at least one communication element in the first group of communication elements, entering a mode in which the communication element performs at least one authorized function requested by a controller, upon:

the respective communication element transceiver receiving from a controller a controller signal that comprises a valid identification key during a time period during which the respective communication element transceiver is sending a series of broadcast signals, or the respective communication element transceiver receiving from a controller a controller signal that comprises a valid identification key during a time period of a third duration starting immediately after the respective sensor of the communication element detecting a jerking motion, said authorized functions comprising communicating to the controller information stored in the respective electronic storage device of the communication element regarding an asset upon such information being requested by the controller, and for each communication element that has entered said mode in which the communication element performs any authorized functions requested by a controller, exiting said mode in which the communication element performs any authorized functions requested by a controller, and resuming said repeating of said sequence upon passage of a time period of a fourth duration during which [A] the respective communication element transceiver does not receive any communication from the controller and [B] the respective sensor of the communication element does not detect any jerking motion.

In some embodiments in accordance with the seventh aspect of the present inventive subject matter, which can include or not include, as suitable, any of the other features described herein, said authorized functions further comprise changing to a different communication channel if such change is requested by the controller.

In accordance with an eighth aspect of the present inventive subject matter, there is provided a method of communicating information regarding an asset from a communication element to a controller, comprising:

wirelessly transmitting from a first communication element a first series of broadcast signals, the first series of broadcast signals comprising a first quantity of broadcast signals transmitted in a first time span, the first communication element capable of receiving signals during the first time span, each broadcast signal in the first series of broadcast signals containing identification information for at least a first asset, the first communication element attached to the first asset, the first communication element comprising a first sensor and a first electronic storage device;

wirelessly transmitting from the first communication element a second series of broadcast signals, the second series of broadcast signals comprising a second quantity of broadcast signals transmitted in a third time span, the first communication element capable of receiving signals during the third time span, each broadcast signal in the second series of broadcast signals containing identification information for at least the first asset, the third time span after a second time span, the second time span after the first time span, the first communication element incapable of receiving signals during the second time span, the second time span at least five times as long as the first time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times as long as the first time span), the second time span at least five times as long as the third time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the third time span), during a fourth time span, the fourth time span after the third time span, causing the first asset to undergo a jerking motion, said jerking motion sensed by the first sensor, said first communication element going into a connection mode upon said sensor sensing said jerking motion, said connection mode causing said first communication element to wirelessly transmit a third series of broadcast signals, the third series of broadcast signals comprising a third quantity of broadcast signals transmitted in a fifth time span, the first communication element capable of receiving signals during the fifth time span, each broadcast signal in the third series of broadcast signals containing identification information for at least the first asset, the fifth time span after the fourth time span, the fifth time span at least five times as long as the first time span and/or the third time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the first time span and/or the third time span), wirelessly receiving by a first controller at least one of the broadcast signals in the third series of broadcast signals during the fifth time span, wirelessly transmitting from the first controller at least a first connection request within the fifth time span, said first connection request comprising identification information for the first controller, after said wirelessly transmitting from the first controller at least a first connection request, the first communication element verifying that the identification information for the first controller is valid, after said first communication element verifying that the identification information for the first controller is valid, transmitting to said first controller information stored in said first electronic storage device regarding the first asset.

In some embodiments in accordance with the eighth aspect of the present inventive subject matter, which can include or not include, as suitable, any of the other features described herein, said method further comprises after said first communication element verifying that the identification information for the first controller is valid, said first communication element switching to a communication channel requested by said first controller.

In some embodiments in accordance with the eighth aspect of the present inventive subject matter, which can include or not include, as suitable, any of the other features described herein, at least one of the broadcast signals comprises at least some information regarding said first asset.

In some embodiments in accordance with the eighth aspect of the present inventive subject matter, which can include or not include, as suitable, any of the other features described herein, the first controller is attached to a receiving element (which, in some cases, is a vehicle, e.g., the controller is attached to a vehicle (and is in or on the vehicle)).

In some embodiments in accordance with the eighth aspect of the present inventive subject matter, which can include or not include, as suitable, any of the other features described herein:
the first controller further comprises a display element, and
the method further comprises the first controller displaying on the display element information received from the first communication element regarding said first asset.

In accordance with a ninth aspect of the present inventive subject matter, there is provided a time-of-use tracking element, comprising:
a sensor; and
an electronic storage device,
the sensor configured to detect jerking motion,
the electronic storage device configured to store data representing the cumulative time during which jerking motion is detected by the sensor.

In some embodiments in accordance with the ninth aspect of the present inventive subject matter, which can include or not include, as suitable, any of the other features described herein, the time-of-use tracking element further comprises a transmitter configured to transmit said data representing the cumulative time during which jerking motion is detected.

In some embodiments in accordance with the ninth aspect of the present inventive subject matter, which can include or not include, as suitable, any of the other features described herein, the second time span at least five times as long as the first time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times as long as the first time span), the second time span at least five times as long as the third time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the third time span), In accordance with a tenth aspect of the present inventive subject matter, there is provided a method of communicating information regarding an asset from a communication element to a controller that is similar to the eighth aspect of the present inventive subject matter, except that the jerking motion occurs during the second time span, i.e., the method comprises:
wirelessly transmitting from a first communication element a first series of broadcast signals, the first series of broadcast signals comprising a first quantity of broadcast signals transmitted in a first time span, the first communication element capable of receiving signals during the first time span, each broadcast signal in the first series of broadcast signals containing identification information for at least a first asset, the first communication element attached to the first asset, the first communication element comprising a first sensor and a first electronic storage device;
during a second time span, the second time span after the first time span, causing the first asset to undergo a jerking motion, said jerking motion sensed by the first sensor, said first communication element going into a connection mode upon said sensor sensing said jerking motion, said connection mode causing said first communication element to wirelessly transmit a second series of broadcast signals, the second series of broadcast signals comprising a second quantity of broadcast signals transmitted in a third time span, the first communication element capable of receiving signals during the third time span, each broadcast signal in the second series of broadcast signals containing identification information for at least the first asset, the third time span after the second time span, the third time span at least five times as long as the first time span (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the first time span),
wirelessly receiving by a first controller at least one of the broadcast signals in the second series of broadcast signals during the third time span,
wirelessly transmitting from the first controller at least a first connection request within the third time span, said first connection request comprising identification information for the first controller,
after said wirelessly transmitting from the first controller at least a first connection request, the first communication element verifying that the identification information for the first controller is valid, after said first communication element verifying that the identification information for the first controller is valid, transmitting to said first controller information stored in said first electronic storage device regarding the first asset.

In accordance with an eleventh aspect of the present inventive subject matter, there is provided a housing for a communication element, the housing comprising a first housing element and a second housing element.

In accordance with a twelfth aspect of the present inventive subject matter, there is provided a communication element within a housing, in which the communication element can be any communication element as described herein (e.g., any communication element in accordance with the first aspect of the present inventive subject matter), and the housing can be any housing as described herein (e.g., any housing in accordance with the twelfth aspect of the present inventive subject matter).

In accordance with a thirteenth aspect of the present inventive subject matter, there is provided a communication element, comprising:
a communication element transceiver,
a sensor, and
an electronic storage device,
in which the sensor is configured to detect jerking motion.
The communication element transceiver, the sensor, the electronic storage device, and any other component in any communication element in accordance with the thirteenth aspect of the present inventive subject matter can correspond to and/or have any feature (or combination of features) of a corresponding component described herein in connection with the first aspect of the present inventive subject matter (e.g., a sensor in a communication element in accordance with the thirteenth aspect of the present inventive subject matter can have any feature described herein in relation to a sensor in a communication element in accordance with the first aspect of the present inventive subject matter, or the communication element can be configured such that the cumulative time during which jerking motion has been detected includes time during which no jerking motion is being detected, but is between two jerking motion events that are separated by not more than a specified length of time (e.g., one minute, thirty seconds, two minutes, etc., and in some of such embodiments, such length of time can be selected and/or varied)).

In some embodiments in accordance with the thirteenth aspect of the present inventive subject matter, which can include or not include, as suitable, any of the other features described herein, the communication element is configured to transmit broadcast signals, and at least one of the broadcast signals comprises at least some information regarding an asset.

In some embodiments in accordance with the thirteenth aspect of the present inventive subject matter, which can include or not include, as suitable, any of the other features described herein, the communication element is attached to an asset.

In some embodiments in accordance with the thirteenth aspect of the present inventive subject matter, which can include or not include, as suitable, any of the other features described herein, the communication element is configured to store data representing the total cumulative amount of time during which jerking motion is detected by the sensor (and in some of such embodiments, such data can be communicated in any way, e.g., by being transmitted via the communication element transceiver).

In some embodiments in accordance with the thirteenth aspect of the present inventive subject matter, which can include or not include, as suitable, any of the other features described herein, the communication element further comprises one or more energy sources, e.g., a battery.

BRIEF DESCRIPTION OF THE DRAWING FIGURES

FIG. 1 is a schematic drawing depicting a site 10 in which a plurality of attachments 11 are located, and a heavy-duty vehicle 12 is on the site. A respective communication element 13 is attached to each of the attachments 11, and a controller 14 is attached to the heavy-duty vehicle 12 (inside the cab of the heavy-duty vehicle).

Figure 4:
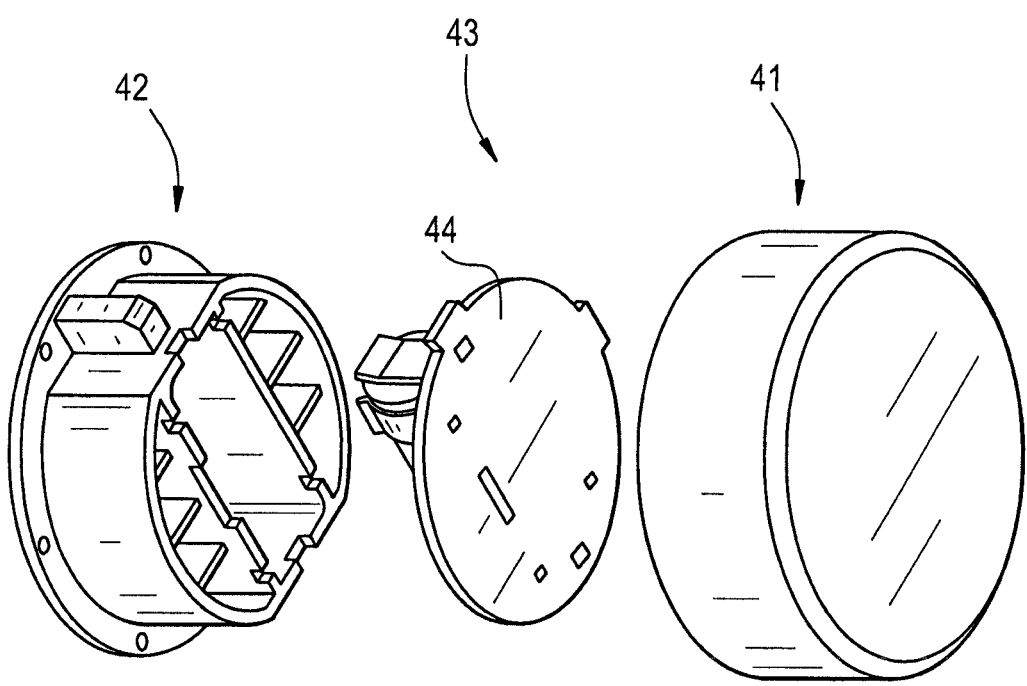

FIG. 4 is a schematic drawing depicting a housing (which comprises a first housing element 41 and a second housing element 42) and a communication element 43.

Figure 5:
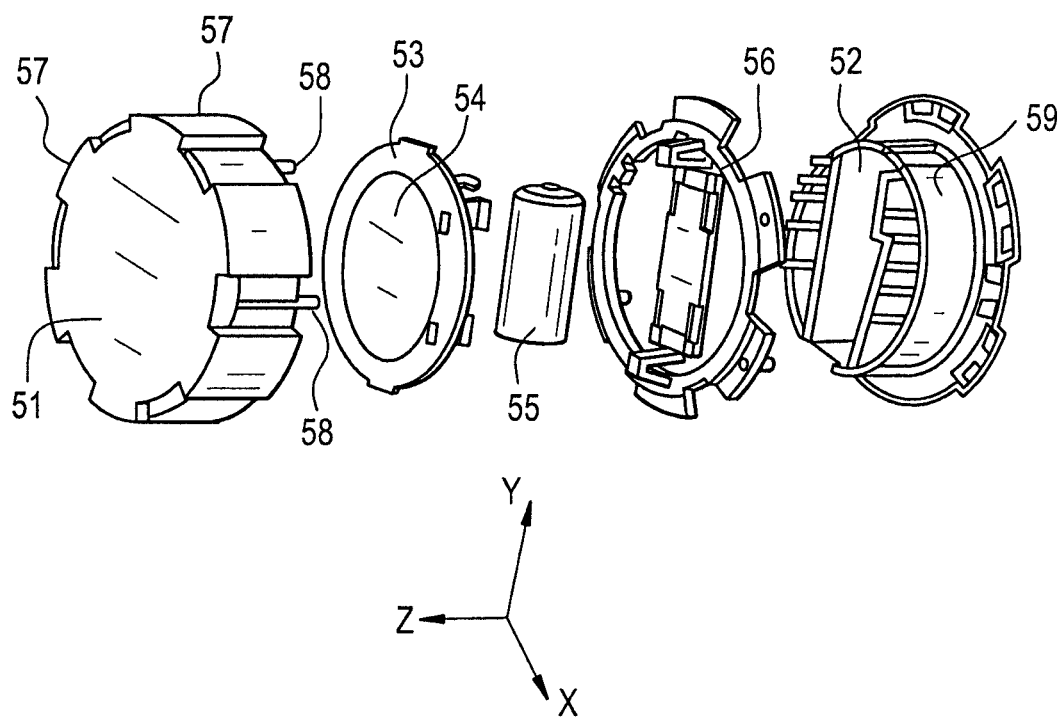

FIG. 5 is a schematic drawing depicting a housing (which comprises a first housing element 51 and a second housing element 52) and a communication element.

Figure 6:
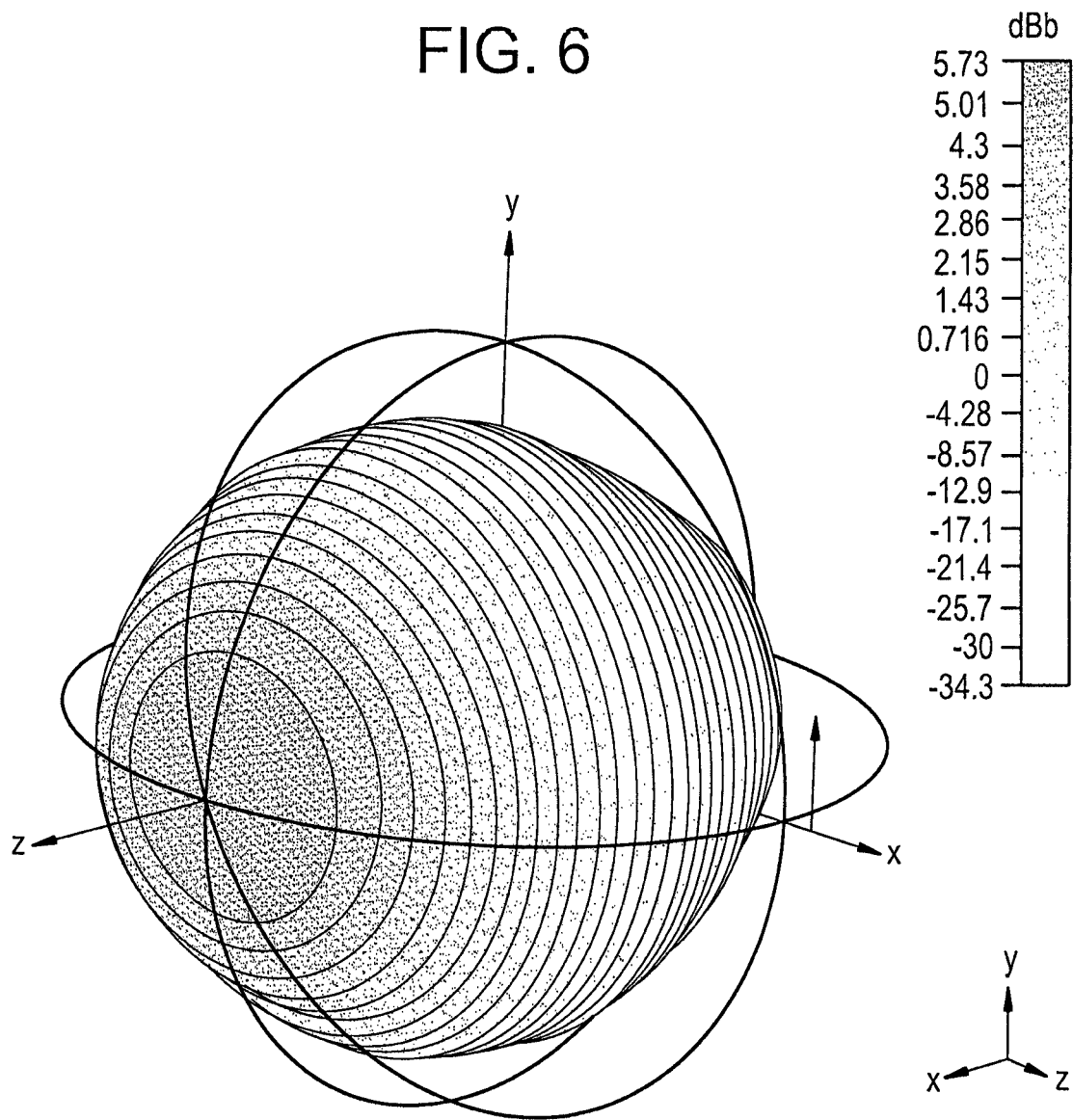

FIG. 6 is a representative plot of the beam generated by the antenna depicted in FIG. 5

DETAILED DESCRIPTION OF THE INVENTIVE SUBJECT MATTER

As noted above, the present inventive subject matter provides communication elements, communication systems and methods of communicating.

The expression "asset," as used herein, means any structure (or structures) that might be inventoried and/or regarding which there might be a desire to have information (such as type of equipment, serial number, hours of use, type of product, etc.) accessed by and/or sent to a receiving element (defined below). As described herein, one or more communication element(s) can be attached to one or more assets. Reference to an "asset" can refer to a single structure or to a plurality of structures (and where "asset" is used, descriptions herein should be understood as including similar items, except that plural assets are provided). Representative examples of "assets" include attachments and implements for heavy equipment (such as heavy-duty vehicles, e.g., toothed buckets, hydraulic hammers, fellers/bunchers, earth compacting vibrators, front loaders, backhoes, man lifts, plows, etc.), storage containers, vehicles, inventoried articles of any nature, etc., as well as groups of items, e.g., groups of attachments and/or implements, groups of storage containers (e.g., a plurality of storage containers that each contain similar items, or that each contain components of a larger structure or system), groups of vehicles (e.g., a fleet of vehicles), groups of inventoried articles, etc. An asset (or a group of assets) can be mobile, stationary, or stationary at some times and mobile at others, the expression mobile including self-moving (such as motorized, e.g., a vehicle), movable by a vehicle (such as a trailer), or both self-moving and movable (such as a motorized trailer), the expression stationary meaning non-moving or movable only to a slight degree, such as a building (e.g., a temporary or permanent office), a site, a natural entity, or any other non-moving (or only slightly moving) physical structure.

The expression "receiving element," as used herein, means any structure to which a controller can be attached. As described herein, one or more controller(s) can be attached to one or more receiving element(s). Reference to a "receiving element" can refer to a single structure or to a plurality of structures (and where "receiving element" is used, descriptions herein should be understood as including similar items, except that plural receiving elements are provided). A receiving element can be mobile, stationary, or stationary at some times and mobile at others. Representative examples of "receiving elements" include vehicles (e.g., a heavy-duty and/or off-road vehicle such as a truck or tractor), buildings (e.g., a temporary or permanent office), or any other unit or facility to which there might be a desire to have information regarding an asset sent.

The definitions above of "receiving element" and of "asset" each encompass a wide variety of entities, and all combinations [1] any of such wide variety of receiving element(s) and [2] any of such asset(s) are included in the scope of the present inventive subject matter (where it involves one or more receiving element(s) and one or more asset(s)). For example, a combination of an asset and a receiving element can include an asset that is mobile (e.g., a heavy-duty vehicle) and a controller that is stationary (or fixed). For another example, a combination of an asset and a receiving element can include a fleet of trucks as an asset and a building as a receiving element. For another example, a combination of an asset and a receiving element can include a fleet of trucks for carrying harvested crops as an asset and a harvester as a receiving element. The definitions above of "receiving element" and of "asset" each encompass vehicles; accordingly, in some embodiments in accordance with the present inventive subject matter, one or more controllers can be mounted on one or more vehicles, and one or more communication elements can be mounted on one or more other vehicles).

The expression "attached", as used herein, means that one or more structural feature is provided such that upon moving a second structure, a first structure that is "attached" to the second structure also moves, i.e., moving the second structure causes the first structure to move (the first structure is not necessarily adhered or rigidly connected to the second structure in order for it to be "attached" to the second structure); in addition, the expression "attached", as used herein, encompasses situations in which a first structure (which is "attached" to a second structure) is "attached" to one or more other structures, which in turn is/are "attached" to the second structure. Accordingly, for a first element to be attached to a second element, the first element can (for example) be rigidly adhered (e.g., using an adhesive) or rigidly connected (e.g., using screws or bolts) to the second element, the first element can be contained within a third element that is adhered to the second element, etc.

In every instance herein where an element or system is described as comprising a component (e.g., "a communication element transceiver", "a sensor", "an electronic storage device", "a controller", etc.), such wording does not preclude the possible existence of more than one such component (e.g., two or more communication element transceivers) in the element or system, and the description herein should be understood to encompass such subject matter.

In every instance herein where a component (or combination of components) is described as being configured to carry out an activity (e.g., "transmit to the communication element a controller signal", "transmit to the communication element a request"), such wording does not preclude the ability to carry out a plural number of such activities (e.g., to transmit to the communication element a plurality of controller signals, etc.), and the description herein should be understood to encompass such subject matter.

In any instance in which communication (e.g., two-way communication) is established between a communication element and a controller (e.g., after a communication element transceiver in a communication element receives from a controller a controller signal that comprises a valid identification key), it should be understood that such communication can include jumping (in many cases, frequently jumping) to different communication channels, as is known in the art. In other words, while a communication element and a controller are communicating (encrypted or non-encrypted) on a particular communication channel, a message might be transmitted (from the communication element to the controller, or vice-versa) to move to a different communication channel, in order to reduce the potential for an unauthorized element to receive and/or submit information from or to the communication. Accordingly, whenever reference is made herein to communication (or communication in a communication channel), it should be understood that such communication can be over a single communication channel or over a sequence of communication channels.

Also, in any instance in which communication (e.g., two-way communication) is established between a communication element and a controller (e.g., after a communication element transceiver in a communication element receives from a controller a controller signal that comprises a valid identification key), communication can be terminated if certain specified conditions are met, e.g., if the controller moves out of range of the communication element (or a specified distance away), if no jerking motion of the asset is detected for a specified duration of time, and/or if no signal is sent by the controller to the communication element for a specified duration of time, etc.

As noted above, in a first aspect of the present inventive subject matter, there is provided a communication element that comprises a communication element transceiver, a sensor, and an electronic storage device, in which the sensor is configured to detect jerking motion, and the communication element is configured to:

repeat a sequence comprising [1] sending from the communication element transceiver a series of broadcast signals during a time period of a first duration, followed by [2] not sending from the communication element transceiver any broadcast signal for a time period of a second duration, discontinue said sequence if [a] during a time period during which the communication element transceiver sends a series of broadcast signals, the communication element transceiver receives from a controller a controller signal that comprises a valid identification key, or [b] any time during said sequence the sensor detects a jerking motion, enter a mode in which the communication element performs any authorized functions requested by a first controller, if:

during a time period during which the communication element transceiver sends a series of broadcast signals, the communication element transceiver receives from the first controller a controller signal that comprises a valid identification key, or during a time period of a third duration starting immediately after the sensor detects a jerking motion, the communication element transceiver receives from the first controller a controller signal that comprises a valid identification key, said authorized functions comprising communicating to the first controller information stored in the electronic storage device regarding an asset if such information is requested by the first controller, and exit said mode in which the communication element performs any authorized functions requested by a first controller, and resume said repeating of said sequence if a time period of a fourth duration passes during which [A] the communication element transceiver does not receive any communication from the first controller and [B] the sensor does not detect any jerking motion.

In embodiments of a communication element in accordance with the first aspect of the present inventive subject matter, the communication element transceiver (and likewise a controller transceiver) can comprise any suitable component (or combination of components) suitable for transmitting wireless signals and receiving wireless signals. That is, the expression "transceiver", as used herein, can refer to a single component (that transmits wireless signals and receives wireless signals), or to a combination of components that comprises at least a component that transmits wireless signals and a component that receives wireless signals. A variety of transceivers (single-component transceivers and multi-component transceivers) are well known to persons of skill in the art (e.g., Bluetooth® radios), and any of such transceivers can be employed in any embodiment corresponding to the present inventive subject matter.

In embodiments of a communication element in accordance with the first aspect of the present inventive subject matter, the sensor can comprise any suitable component (or combination of components) that is configured to detect a jerking motion. A variety of sensors (e.g., many types of accelerometers) that are configured to detect a jerking motion are well known to persons of skill in the art, and any of such sensors can be employed in any embodiment corresponding to the first aspect of the present inventive subject matter. A jerking motion (which a sensor can detect as such) can be, for example, motion of an asset (on which a sensor is mounted) caused by the asset (e.g., an attachment for a heavy-duty vehicle) being bumped (e.g., by a heavy-duty vehicle), and/or by motion of an asset (on which a sensor is mounted) caused by the asset being moved (e.g., by the asset being attached to a heavy-duty vehicle and the heavy-duty vehicle traveling and/or using the asset to perform a task (such as digging and/or lifting). In some embodiments in accordance with the present inventive subject matter, which can include or not include any other feature described herein, a sensor or sensors (e.g., one or more accelerometers) can be adjustable, e.g., to vary the magnitude of motion (and/or force) required to result in the sensor reporting a jerking motion.

In embodiments of a communication element in accordance with the first aspect of the present inventive subject matter, the electronic storage device can comprise any suitable component (or combination of components) that is configured to store electronic data. A variety of electronic storage devices are well known to persons of skill in the art, and any of such electronic storage devices can be employed in any embodiment corresponding to the first aspect of the present inventive subject matter.

In embodiments of a communication element in accordance with the first aspect of the present inventive subject matter, the controller (from which the communication element transceiver might receive a controller signal that comprises a valid identification key, and/or from which the communication element transceiver might receive a request for information stored in the electronic storage device regarding an asset) can comprise any suitable component (or combination of components) that is configured to transmit wireless signals to the communication element and receive wireless signals from the communication element.

In embodiments of a communication element in accordance with the first aspect of the present inventive subject matter, the time period of a first duration (i.e., the time period during which the communication element transceiver sends a series of broadcast signals) can be any suitable length of time. In some embodiments according to the first aspect of the present inventive subject matter, which can include or not include, as suitable, any of the other features described herein, the communication element is configured to allow a user to adjust the time period of a first duration to any suitable desired length of time. In some embodiments according to the first aspect of the present inventive subject matter, which can include or not include, as suitable, any of the other features described herein, during such time period of a first duration, the broadcast signals in the series of broadcast signals are spaced apart by a short period of time (e.g., between 1 millisecond and 1 second, e.g., not less than 10 milliseconds, 25 milliseconds, 50 milliseconds, 75 milliseconds, or 90 milliseconds, and not more than 750 milliseconds, 500 milliseconds, 350 milliseconds, 300 milliseconds, 250 milliseconds, 200 milliseconds, 150 milliseconds, 125 milliseconds or 110 milliseconds).

In embodiments of a communication element in accordance with the first aspect of the present inventive subject matter, the time period of a second duration (i.e., a time period during which the communication element transceiver does not send a series of broadcast signals) can be any suitable length of time. In some embodiments according to the first aspect of the present inventive subject matter, which can include or not include, as suitable, any of the other features described herein, the communication element is configured to allow a user to adjust the time period of a second duration to any suitable desired length of time. In some embodiments according to the first aspect of the present inventive subject matter, which can include or not include, as suitable, any of the other features described herein, the time period of a second duration is substantially longer than the time period of a first duration, e.g., the time period of a second duration is at least 10 times the time period of the first duration (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the time period of the first duration).

In embodiments of a communication element in accordance with the first aspect of the present inventive subject matter, the time period of a third duration (i.e., the time period starting immediately after the sensor detects a jerking motion, during which if the communication element transceiver receives from the first controller a controller signal that comprises a valid identification key, the communication element enters a mode in which the communication element performs any authorized functions requested by the first controller) can be any suitable length of time. In some embodiments according to the first aspect of the present inventive subject matter, which can include or not include, as suitable, any of the other features described herein, the communication element is configured to allow a user to adjust the time period of a third duration to any suitable desired length of time. In some embodiments according to the first aspect of the present inventive subject matter, which can include or not include, as suitable, any of the other features described herein, the time period of a third duration is substantially longer than the time period of a first duration, e.g., the time period of a third duration is at least 10 times the time period of the first duration (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the time period of the first duration).

In embodiments of a communication element in accordance with the first aspect of the present inventive subject matter, the time period of a fourth duration (i.e., the length of time that if, while the communication element is in a mode in which the communication element performs any authorized functions requested by a first controller, [A] the communication element transceiver does not receive any communication from the first controller and [B] the sensor does not detect any jerking motion, the communication element exits said mode in which the communication element performs any authorized functions requested by a first controller, and resumes said repeating of said sequence) can be any suitable length of time. In some embodiments according to the first aspect of the present inventive subject matter, which can include or not include, as suitable, any of the other features described herein, the communication element is configured to allow a user to adjust the time period of a fourth duration to any suitable desired length of time. In some embodiments according to the first aspect of the present inventive subject matter, which can include or not include, as suitable, any of the other features described herein, the time period of a fourth duration is substantially longer than the time period of a first duration, e.g., the time period of a fourth duration is at least 10 times the time period of the first duration (and in some embodiments at least 15 times, at least 20 times, at least 30 times, at least 40 times, at least 50 times, at least 60 times, at least 90 times, at least 120 times, at least 180 times, at least 240 times, at least 480 times, at least 960 times, at least 1500 times, at least 3000 times, at least 5000 times, at least 10,000 times, at least 50,000 times, or at least 100,000 times the time period of the first duration).

In some embodiments according to the first aspect of the present inventive subject matter, which can include or not include, as suitable, any of the other features described herein, the communication element is configured to determine whether a controller identification key received from a controller is valid, by determining whether the controller identification key received from a controller corresponds to one or more authentic identification keys stored in the electronic storage device, and/or to determine whether a controller identification key received from a controller corresponds to one or more key rules stored in the electronic storage device (e.g., every third character must be a number and for every sequence of two or more letters, the letters must be three letters apart alphabetically, etc.).

The expression "communication channel," as used herein, refers to any suitable range of wavelengths over which wireless signals can be transmitted and received. Persons of skill in the art recognize that a communication channel typically is a 2 MHz range of frequencies within an overall 2.4 GHz range of frequencies.

In embodiments of a communication element in accordance with the first aspect of the present inventive subject matter, while the communication element is in said "mode in which the communication element performs any authorized functions requested by a first controller," the communication element is configured to change to a different communication channel (i.e., different from the communication channel in which the communication element received from the controller a controller signal that comprises a valid identification key) upon receiving a request from the controller to change to a different communication channel. In some of such embodiments, which can include or not include any other features described herein, the controller can request a change to a specific communication channel, and/or the controller can request a change to encrypted communication (and in some of such embodiments, the controller can send to the communication element an encryption key for encrypting and de-encrypting signals). Alternatively, in some of such embodiments, which can include or not include any other features described herein, once the communication element receives a valid identification key from a controller, the communication element can request a change to a specific communication channel, and/or the communication element can request a change to encrypted communication (and in some of such embodiments, the communication element can send to the controller an encryption key for encrypting and de-encrypting signals). As further alternatives, in some of such embodiments, which can include or not include any other features described herein, once the communication element receives a valid identification key from a controller, either one of the controller and the communication element can send (to the other of the controller and the communication element) any signal(s) from among a request a change to a specific communication channel, a request to change to encrypted communication, and an encryption key for encrypting and de-encrypting signals.

As noted above, while the communication element is in said "mode in which the communication element performs any authorized functions requested by a first controller," the communication element is configured to communicate to the controller information stored in the electronic storage device regarding an asset, if such information is requested by the controller. Such information stored in the electronic storage device regarding an asset can include any suitable information, e.g.,

[1] the nature of the asset (for example, if the asset is an attachment for heavy-duty equipment, the type of attachment, such as, a front loader, a backhoe, a man lift, a plow, etc., that the asset is a storage box, etc.);

[2] identifying information regarding the asset (e.g., a serial number for an attachment, an inventory number for a storage container, etc.);

[3] the age of the asset (and/or the date on which the asset was created or first used);

[4] the quantity of hours that the asset has been used; etc.

In some embodiments according to the first aspect of the present inventive subject matter, which can include or not include, as suitable, any of the other features described herein, one or more of the broadcast signals contains at least some information regarding an asset. Such information can comprise any suitable information, e.g., any of the information described above with regard to information that can be stored in the electronic storage device regarding an asset. In some of such embodiments, the communication element can be attached to the asset regarding which it is broadcasting information.

In some embodiments according to the first aspect of the present inventive subject matter, which can include or not include, as suitable, any of the other features described herein, the communication element is attached to an asset.

In some embodiments according to the first aspect of the present inventive subject matter, which can include or not include, as suitable, any of the other features described herein, the communication element transceiver receives a controller signal from a controller that is attached to a receiving element.

In some embodiments according to the first aspect of the present inventive subject matter, which can include or not include, as suitable, any of the other features described herein, the communication element transceiver receives a controller signal from a controller that comprises a display element. In some of such embodiments, the controller is configured to display on the display element information received from the communication element regarding an asset.

As noted above, in some embodiments in accordance with the first aspect of the present inventive subject matter, the communication element is further configured to store data representing the total cumulative time during which jerking motion has been detected by the sensor, and in accordance with the ninth aspect of the present invention, there is provided a time-of-use tracking element that comprises a sensor and an electronic storage device, in which the sensor is configured to detect jerking motion, and the electronic storage device is configured to store data representing the cumulative time during which jerking motion has been detected by the sensor. In such embodiments, the communication element or the time-of-use tracking element can be configured such that the cumulative time during which jerking motion has been detected includes time during which no jerking motion is being detected, but is between two jerking motion events that are separated by not more than a specified length of time (e.g., one minute, thirty seconds, two minutes, etc., and in some of such embodiments, such length of time can be selected and/or varied).

As noted above, in a second aspect of the present inventive subject matter, there is provided a communication system, comprising:
  a communication element; and
  a controller,
  the controller comprising a controller transceiver,
  the controller transceiver configured to:
    transmit to the communication element a controller signal that comprises a valid identification key;
    transmit to the communication element requests that the communication element transmit to the controller information stored in the electronic storage device regarding an asset, and receive from the communication element information stored in the electronic storage device regarding said asset.

In embodiments in accordance with the second aspect of the present inventive subject matter, the communication element is any communication element in accordance with the first aspect of the present inventive subject matter.

In some embodiments according to the second aspect of the present inventive subject matter, which can include or not include, as suitable, any of the other features described herein, the controller is also configured to request that the communication element change to a different communication channel.

In some embodiments according to the second aspect of the present inventive subject matter, which can include or not include, as suitable, any of the other features described herein, the controller is attached to a receiving element (and in some cases, the receiving element is a vehicle).

In some embodiments according to the second aspect of the present inventive subject matter, which can include or not include, as suitable, any of the other features described herein, the controller further comprises a display element, and the controller is configured to display on the display element information received from the communication element regarding an asset.

As noted above, in a third aspect of the present inventive subject matter, there is provided a communication system, comprising:
  a communication element; and
  a plurality of controllers,
  each controller comprising a respective controller transceiver,
  each controller transceiver configured to:
    transmit to the communication element a respective controller signal that comprises a valid identification key; and
    transmit to the communication element requests that the communication element transmit to the respective controller information stored in the electronic storage device regarding an asset, and receive from the communication element information stored in the electronic storage device regarding said asset.

In embodiments in accordance with the third aspect of the present inventive subject matter, the communication element is any communication element in accordance with the first aspect of the present inventive subject matter.

In some embodiments according to the third aspect of the present inventive subject matter, which can include or not include, as suitable, any of the other features described herein, each controller is also configured to request that the communication element change to a different communication channel.

In some embodiments according to the third aspect of the present inventive subject matter, which can include or not include, as suitable, any of the other features described herein, each controller is attached to a respective receiving element (and in some cases, the receiving element is a vehicle).

In some embodiments according to the third aspect of the present inventive subject matter, which can include or not include, as suitable, any of the other features described herein, each controller further comprises a display element, and is configured to display on the display element information received from the communication element regarding an asset.

As noted above, in a fourth aspect of the present inventive subject matter, there is provided a communication system, comprising:
  a plurality of communication elements; and
  a controller,
  the controller comprising a controller transceiver,
  the controller transceiver configured to:
    transmit to at least some of the communication elements a controller signal that comprises a valid identification key; and
    transmit to at least some of the communication elements requests that the respective communication element transmit to the controller information stored in the respective electronic storage device regarding an asset, and receive from the respective communication element information stored in the respective electronic storage device regarding said asset.

In embodiments in accordance with the fourth aspect of the present inventive subject matter, each communication element is any communication element in accordance with the first aspect of the present inventive subject matter.

In some embodiments according to the fourth aspect of the present inventive subject matter, which can include or not include, as suitable, any of the other features described herein, the controller is also configured to request that a communication element change to a different communication channel.

In some embodiments according to the fourth aspect of the present inventive subject matter, which can include or not include, as suitable, any of the other features described herein, the controller is attached to a respective receiving element (and in some cases, the receiving element is a vehicle).

In some embodiments according to the fourth aspect of the present inventive subject matter, which can include or not include, as suitable, any of the other features described herein, the controller further comprises a display element, and is configured to display on the display element information received from a communication element regarding an asset.

As noted above, in a fifth aspect of the present inventive subject matter, there is provided a communication system, comprising:
  a plurality of communication elements; and
  a plurality of controllers,
  each controller comprising a respective controller transceiver, each controller transceiver configured to:
  transmit to at least some of the communication elements a respective controller signal that comprises a valid identification key; and
  transmit to at least some of the communication elements requests that the respective communication element transmit to the respective controller information stored in the respective electronic storage device regarding an asset, and receive from the respective communication element information stored in the respective electronic storage device regarding said asset.

In embodiments in accordance with the fifth aspect of the present inventive subject matter, each communication element is any communication element in accordance with the first aspect of the present inventive subject matter.

In some embodiments according to the fifth aspect of the present inventive subject matter, which can include or not include, as suitable, any of the other features described herein, each controller is also configured to request that any of the communication elements change to a different communication channel.

In some embodiments according to the fifth aspect of the present inventive subject matter, which can include or not include, as suitable, any of the other features described herein, each controller is attached to a respective receiving element (and in some cases, the receiving element is a vehicle).

In some embodiments according to the fifth aspect of the present inventive subject matter, which can include or not include, as suitable, any of the other features described herein, each controller further comprises a display element, and is configured to display on the display element information received from any of the communication elements regarding an asset.

As noted above, in accordance with a seventh aspect of the present inventive subject matter, there is provided a method in which each of a plurality of communication elements comprises a respective communication element transceiver, a respective sensor and a respective electronic storage device.

In some embodiments according to the seventh aspect of the present inventive subject matter, which can include or not include, as suitable, any of the other features described herein, each of the communication elements is attached to a respective asset (e.g., an equipment yard comprises a plurality of heavy equipment attachments and implements, each of which comprises a respective communication element). In some of such embodiments, a vehicle with a controller can enter an area in which such a plurality of assets resides, can bump one of the assets to cause that asset to initiate a series of broadcast signals, can transmit a valid identification key to cause the communication element on that asset to enter the mode in which it performs any authorized function requested by the controller, can request that the communication element communicate with it on a different communication channel, can request from the communication element information regarding the asset, can receive from the communication element information regarding the asset, and can display such information on a display element in the vehicle.

As noted above, in accordance with an eighth aspect of the present inventive subject matter, there is provided a method that comprises (among other things):
  wirelessly transmitting from a first communication element a first quantity of broadcast signals transmitted in a first time span,
  wirelessly transmitting from the first communication element second series of broadcast signals in a third time span, the third time span after a second time span, the second time span after the first time span,
  causing the first asset to undergo a jerking motion during a fourth time span,
  wirelessly transmitting from the first communication element a third quantity of broadcast signals, wirelessly receiving by a first controller at least one of the broadcast signals in the third series of broadcast signals, and wirelessly transmitting from the first controller at least a first connection request in a fifth time span.

In some embodiments according to the eighth aspect of the present inventive subject matter, which can include or not include, as suitable, any of the other features described herein, the first time span can be any suitable duration of time, e.g., 2 seconds, 3 seconds, 4 seconds, 5 seconds, 7 seconds, 10 seconds, 15 seconds, 20 seconds, 30 seconds, 45 seconds, or 60 seconds.

In some embodiments according to the eighth aspect of the present inventive subject matter, which can include or not include, as suitable, any of the other features described herein, the second time span can be any suitable duration of time, e.g., 2 minutes, 3 minutes, 4 minutes, 5 minutes, 7 minutes, 10 minutes, 15 minutes, 20 minutes, 30 minutes, 45 minutes, or 60 minutes.

In some embodiments according to the eighth aspect of the present inventive subject matter, which can include or not include, as suitable, any of the other features described herein, the third time span can be any suitable duration of time, e.g., 2 seconds, 3 seconds, 4 seconds, 5 seconds, 7 seconds, 10 seconds, 15 seconds, 20 seconds, 30 seconds, 45 seconds, or 60 seconds.

In some embodiments according to the eighth aspect of the present inventive subject matter, which can include or not include, as suitable, any of the other features described herein, the fourth time span can be any suitable duration of time, e.g., 2 minutes, 3 minutes, 4 minutes, 5 minutes, 7 minutes, 10 minutes, 15 minutes, 20 minutes, 30 minutes, 45 minutes, or 60 minutes.

In some embodiments according to the eighth aspect of the present inventive subject matter, which can include or not include, as suitable, any of the other features described herein, the fifth time span can be any suitable duration of time, e.g., 30 seconds, 45 seconds, 1 minute, 2 minutes, 3 minutes, 4 minutes, 5 minutes, 7 minutes, 10 minutes, or 15 minutes.

As noted above, in accordance with an eleventh aspect of the present inventive subject matter, there is provided a housing for a communication element, the housing comprising a first housing element and a second housing element.

In some embodiments according to the eleventh aspect of the present inventive subject matter, which can include or not include, as suitable, any of the other features described herein, the housing comprises at least a first exterior surface and at least a first interior surface, the first interior surface and the first exterior surface adjacent to one another on opposite sides of a first region of the housing.

In some embodiments according to the eleventh aspect of the present inventive subject matter, which can include or not include, as suitable, any of the other features described herein, the housing further comprises a sealing basket between the first housing element and the second housing element.

In some embodiments according to the eleventh aspect of the present inventive subject matter, which can include or not include, as suitable, any of the other features described herein, the first housing element and the second housing element are made of highly durable fiberglass-reinforced resin, whereby the housing can withstand harsh environments and can be mounted in a variety of applications using any suitable mounting brackets and hardware.

In some embodiments according to the eleventh aspect of the present inventive subject matter, which can include or not include, as suitable, any of the other features described herein, the second housing element is staked to the first housing element, to provide a weather-proof seal. The expression "staking", as used herein, refers to:

[1] Interference staking, i.e., a process of connecting two components by creating an interference fit between the two pieces. One workpiece has a hole in it while the other has a boss that fits within the hole. The boss is very slightly undersized so that it forms a slip fit. A staking punch is then used to expand the boss radially and to compress the boss axially so as to form an interference fit between the workpieces. This forms a permanent joint.

and/or

[2] Thermoplastic staking, also known as heat staking, is similar to interference staking, except that it uses heat to deform the plastic boss, instead of cold forming. A plastic stud protruding from one component fits into a hole in the second component. The stud is then deformed through the softening of the plastic to form a head which mechanically locks the two components together. Thermoplastic staking is a versatile technique benefitting from being quick, economical and consistent. Unlike welding techniques, staking has the capacity to join plastics to other materials (e.g. metal, PCB's) in addition to joining like or dissimilar plastics.

As noted above, in accordance with a twelfth aspect of the present inventive subject matter, there is provided a communication element within a housing, in which the communication element can be any communication element as described herein (e.g., any communication element in accordance with the first aspect of the present inventive subject matter), and the housing can be any housing as described herein (e.g., any housing in accordance with the twelfth aspect of the present inventive subject matter).

In some embodiments according to the twelfth aspect of the present inventive subject matter, which can include or not include, as suitable, any of the other features described herein, the housing comprises at least a first exterior surface and at least a first interior surface, the first interior surface and the first exterior surface are adjacent to one another on opposite sides of a first region of the housing, and the antenna (of the communication element) is in contact with the first interior surface.

Embodiments in accordance with the present inventive subject matter are described herein in detail in order to provide exact features of representative embodiments that are within the overall scope of the present inventive subject matter. The present inventive subject matter should be understood to be not limited to such detail.

In another representative embodiment in accordance with the present inventive subject matter, a heavy-duty vehicle in which a controller is mounted is driven by an operator into a site in which a plurality of heavy-duty attachments are located. Each of the heavy-duty attachments has a respective communication element attached to it.

Figure 1:
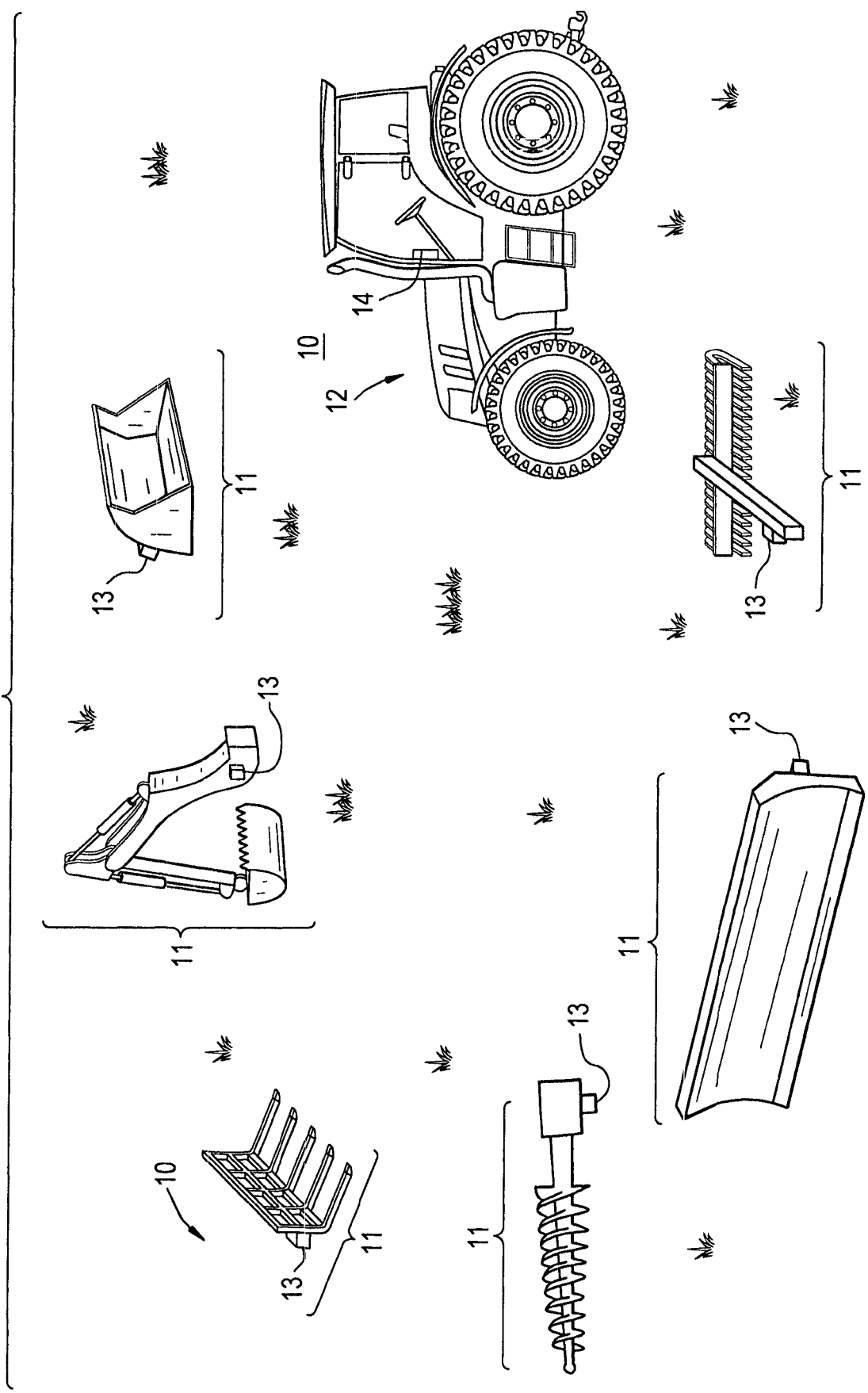

FIG. 1 is a schematic drawing depicting a site 10 in which a plurality of attachments 11 are located, and a heavy-duty vehicle 12 on the site. A respective communication element 13 is attached to each of the attachments 11. A controller 14 is attached to the heavy-duty vehicle 12.

Figure 2:
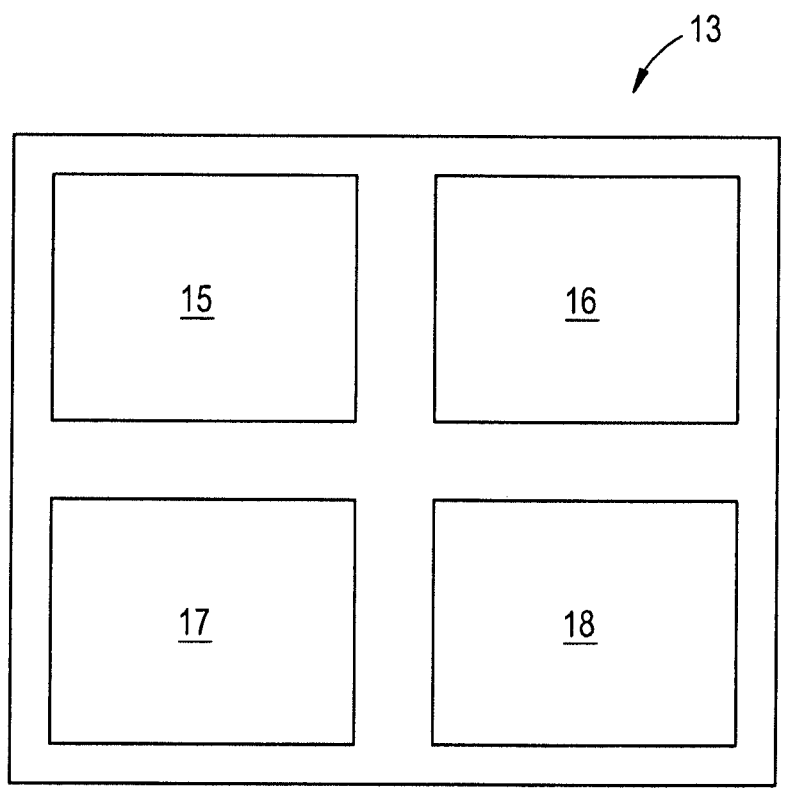
FIG. 2 is a schematic drawing depicting one of the communication elements 13 depicted in FIG. 1.

FIG. 2 is a schematic drawing depicting one of the communication elements 13 depicted in FIG. 1. As shown in FIG. 2, the communication element 13 comprises a transceiver 15 (in the form of a Bluetooth® radio), a sensor 16 (in the form of an accelerometer), an electronic storage device 17 and a battery 18.

Figure 3:
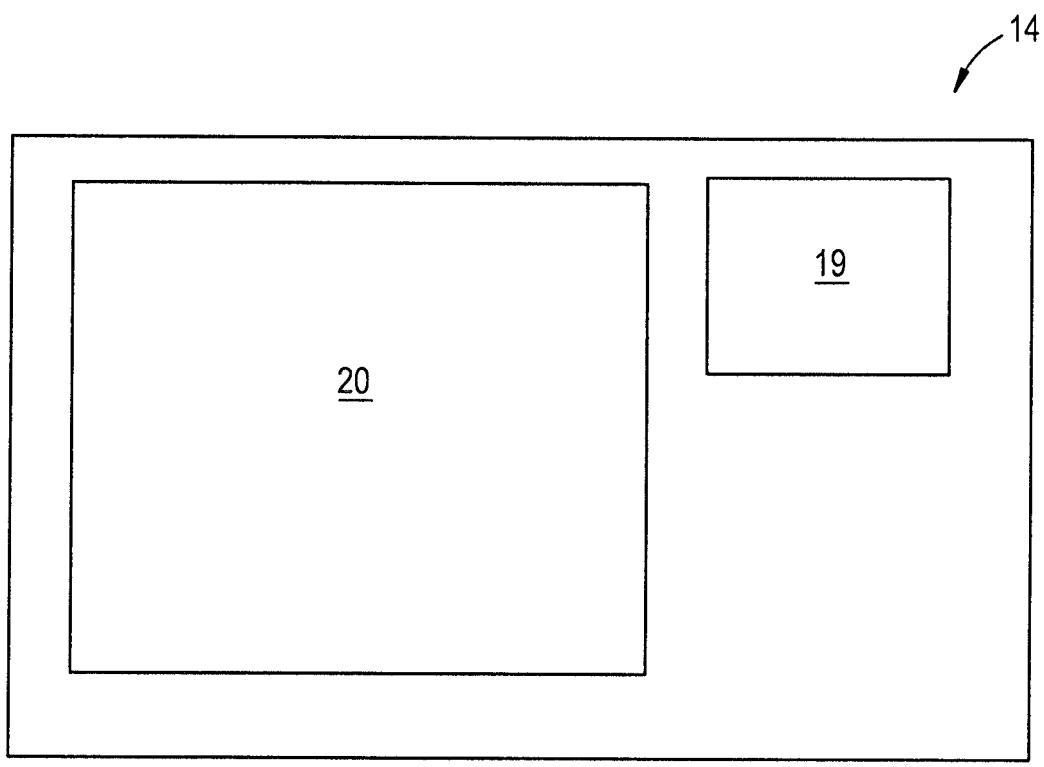
FIG. 3 is a schematic drawing depicting the controller 14 depicted in FIG. 1.

FIG. 3 is a schematic drawing depicting the controller 14 depicted in FIG. 1. The controller 14 (in the form of a smart phone) comprises a controller transceiver 19 and a display element 20.

As the heavy-duty vehicle approaches the site, each of the communication elements is in a respective stage of a cycle consisting of repeating a sequence of (i) a broadcasting mode, in which for a period of four seconds, the communication element repeatedly sends a broadcast signal (each signal about 100 milliseconds apart) containing information as to the nature of the attachment to which the communication element is attached, and (ii) a sleep mode of four minutes in duration, during which the communication element does not transmit or receive any signals.

In this embodiment, when the heavy-duty vehicle comes into range of the communication elements, each of the communication elements happens to be in a sleep mode. Either substantially simultaneously or in any random sequence, the communication elements complete their respective sleep periods and begin respective broadcasting modes. During broadcasting mode, each communication element broadcasts information (e.g., the type of attachment, the hours the attachment has been used, a photograph of the attachment, etc.) regarding the respective attachment to which it is attached is transmitted from the communication element to the controller, and then is transmitted (wirelessly or by wire) to a display element in the vehicle, where it is displayed and can be viewed by the operator.

For each communication element, after four seconds, the broadcasting mode is completed and the communication element returns to the sleep mode. At some stage, the operator drives the vehicle to an attachment whose communication element is in a sleep mode, and causes the vehicle to bump into that attachment. The sensor in that communication element detects the resulting jerking motion, and causes the communication element to enter a signal-receiving mode, during which the communication element transmits, every 25 milliseconds, information regarding the attachment to which it is attached. In less than two minutes, the operator of the vehicle indicates a desire to communicate with the attachment (e.g., by pressing a button or, in instances where the display element comprises a touchscreen, tapping an icon on the display element), which prompts the controller to send to the communication element a signal that contains identification information that the communication element can analyze for validity, a request to communicate on a particular communication channel, an encryption key for encrypting and de-encrypting messages, and one or more requests for information regarding the attachment. The communication element determines that the identification information is valid, transfers to the communication channel that the controller requested, and sends information (in encrypted format) requested by the controller that is stored in the communication element's storage device regarding the attachment. Communication continues (on the communication channel that the controller requested, or jumping from time-to-time to other communication channels) as the controller requests additional information (which the communication element transmits to the controller) and then the vehicle causes the attachment to undergo jerking motions as it connects to the attachment, then transports the attachment, then completes work using the attachment, then transports the attachment again, and then disengages with the attachment. Two minutes after disengaging with the attachment, during which time the attachment is not caused to undergo any jerking motion and the controller does not send any signals to the communication element, the communication element returns to its sleep mode (within the above-mentioned cycle).

Some time later, a second heavy-duty vehicle enters the site. As the heavy-duty vehicle approaches the site, each of the communication elements is in some stage of the above-mentioned cycle. When the heavy-duty vehicle comes into range of the communication elements, several of the communication elements happen to be in their respective broadcasting modes (during which, as above, each communication element broadcasts information regarding the respective attachment to which it is attached, and such broadcast information is received by the controller, and such broadcast information is transmitted to a display element in the vehicle, where it is displayed and can be viewed by the operator). Within four seconds of the initiation of the broadcasting mode for a specific attachment, the operator of the vehicle indicates a desire to communicate with that attachment, which prompts the controller to send to the communication element attached to that attachment a signal that contains identification information that the communication element can analyze for validity, a request to communicate on a particular communication channel, an encryption key for encrypting and de-encrypting messages, and one or more requests for information regarding the attachment. The communication element determines that the identification information is valid, transfers to the communication channel that the controller requested, and sends information (in encrypted format) requested by the controller that is stored in the communication element's storage device regarding the attachment. Communication continues (on the communication channel that the controller requested, or jumping from time-to-time to other communication channels) as the controller requests additional information (which the communication element transmits to the controller) and then the vehicle causes the attachment to undergo jerking motions as it connects to the attachment, then transports the attachment, then completes work using the attachment, then transports the attachment again, and then disengages with the attachment. Two minutes after disengaging with the attachment, during which time the attachment is not caused to undergo any jerking motion and the controller does not send any signals to the communication element, the communication element returns to its sleep mode (within the above-mentioned cycle).

In another representative embodiment in accordance with an aspect of the present inventive subject matter, [1] a communication element is provided that comprises a Bluetooth® radio (as a communication element transceiver), an accelerometer (as a sensor), a processor (which comprises a microcontroller, on which software is loaded, and an electronic storage device), a printed circuit board, a battery and an enclosure, and [2] a controller is provided that comprises a smart phone (on which software is loaded and which comprises an electronic storage device) and a display element.

The Bluetooth® radio, the accelerometer, the processor and the battery are all mounted on the printed circuit board. The printed circuit board is configured (and the Bluetooth® radio, the accelerometer, the processor and the battery are mounted on the circuit board), and the software is coded, such that the communication element functions as described herein. With the benefit of the present disclosure, persons of skill in the art are readily able to generate software, configure a circuit board, and attach to such circuit board a Bluetooth® radio, an accelerometer, a processor and a battery, in ways that the resulting structure functions as any and all of the communication elements described herein. Batteries, Bluetooth® radios and accelerometers that are suitable for use in making the communication elements as disclosed herein are readily available. The enclosure can be any suitable structure, and persons of skill in the art can readily design and make enclosures for the communication elements disclosed herein.

As for the controller, persons of skill in the art are readily able to generate software that enables a smart phone to function as any and all of the controllers described herein. Display components that can perform the functions of the display element herein are readily available. A smart phone can be connected to a display component in any suitable way, e.g., wirelessly or by wire.

FIG. 4 is a schematic drawing depicting a housing (which comprises a first housing element 41 and a second housing element 42) and a communication element 43. In the embodiment depicted in FIG. 4, a side of the printed circuit board 44 of the communication element 43 (which comprises an antenna) is snug to the inner surface of the right side of the first housing element, so that the first housing element acts as an antenna.

FIG. 5 is a schematic drawing depicting a housing (which comprises a first housing element 51 and a second housing element 52) and a communication element. In the embodiment depicted in FIG. 5, the communication element comprises a printed circuit board 53 on which is formed an antenna 54, a battery 55 and a gasket 56. Referring to FIG. 5, the first housing element 51 comprises ribs 57 and stakes 58, and the second housing element 52 comprises internal walls 59. The ribs 57 enhance the durability of the housing without compromising performance of the communication element. The stakes 58 provide for staking the first and second housing elements 51 and 52 to each other.

With respect to the X, Y, Z axes depicted in FIG. 5, the main beam of the antenna is in the Z-axis. Accordingly, the communication element is most suitably positioned with respect to an asset (i.e., the asset regarding which it is associated) such that the Z axis extends away from the asset (e.g., perpendicular or tangential to a surface of the asset to which the communication element is nearest, as would readily be understood by persons of skill in the art.

FIG. 6 is a representative plot of the beam generated by the antenna depicted in FIG. 5 (with the X, Y and Z axes in FIG. 6 corresponding to the X, Y and Z axes in FIG. 5). The scale (color or grayscale) represents directivity (i.e., the ratio of power in 3D space), not gain (which depends on any loss due to the housing).

The invention claimed is:
1. A communication element, comprising:
a communication element transceiver,
a sensor, and
an electronic storage device,
the sensor configured to detect jerking motion,
the communication element configured to:
repeat a sequence comprising [1] sending from the communication element transceiver a series of broadcast signals during a time period of a first duration, followed by [2] not sending any broadcast signal from the communication element transceiver for a time period of a second duration, discontinue said sequence if [a] during a time period during which the communication element transceiver sends a series of broadcast signals, the communication element transceiver receives from any controller a controller signal that comprises a valid identification key, or [b] any time during said sequence the sensor detects a jerking motion, enter a mode in which the communication element performs any authorized functions requested by a first controller, if:

during a time period during which the communication element transceiver sends a series of broadcast signals, the communication element transceiver receives from the first controller a controller signal that comprises a valid identification key, or during a time period of a third duration starting immediately after the sensor detects a jerking motion, the communication element transceiver receives from the first controller a controller signal that comprises a valid identification key, said authorized functions comprising communicating to the first controller information stored in the electronic storage device regarding an asset if such information is requested by the first controller, and exit said mode in which the communication element performs any authorized functions requested by the first controller, and resume said repeating of said sequence if a time period of a fourth duration passes during which [A] the communication element transceiver does not receive any communication from the first controller and [B] the sensor does not detect any jerking motion.

2. The communication element recited in claim 1, wherein at least one of the broadcast signals comprises at least some information regarding an asset.

3. The communication element recited in claim 1, wherein the communication element is attached to an asset.

4. The communication element recited in claim 1, wherein said authorized functions further comprise changing to a different communication channel if such change is requested by the first controller.

5. A communication system, comprising:
a communication element as recited in claim 1; and
the first controller,
the first controller comprising a controller transceiver,
the controller transceiver configured to:
transmit to the communication element a controller signal that comprises a valid identification key;
transmit to the communication element requests that the communication element transmit to the first controller information stored in the electronic storage device regarding an asset, and receive from the communication element information stored in the electronic storage device regarding said asset.

6. The communication system recited in claim 5, wherein the first controller is also configured to request that the communication element change to a different communication channel.

7. The communication system recited in claim 5, wherein the first controller is attached to a receiving element.

8. The communication system recited in claim 7, wherein the receiving element is a vehicle.

9. The communication system recited in claim 5, wherein:
the first controller further comprises a display element, and
the first controller is configured to display on the display element information received from the communication element regarding said asset.

10. A communication system, comprising:
a communication element as recited in claim 1; and
a plurality of controllers,
each controller comprising a respective controller transceiver,
each controller transceiver configured to:
transmit to the communication element a respective controller signal that comprises a valid identification key; and
transmit to the communication element requests that the communication element transmit to the respective controller information stored in the electronic storage device regarding an asset, and receive from the communication element information stored in the electronic storage device regarding said asset.

11. A communication system, comprising:
a plurality of communication elements, each of said communication elements as recited in claim 1; and
the first controller,
the first controller comprising a controller transceiver,
the first controller transceiver configured to:
transmit to at least some of the communication elements a controller signal that comprises a valid identification key; and
transmit to at least some of the communication elements requests that the respective communication element transmit to the first controller information stored in the respective electronic storage device regarding an asset, and receive from the respective communication element information stored in the respective electronic storage device regarding said asset.

12. A communication system, comprising:
a plurality of communication elements, each of said communication elements as recited in claim 1; and
a plurality of controllers,
each controller comprising a respective controller transceiver,
each controller transceiver configured to:
transmit to at least some of the communication elements a respective controller signal that comprises a valid identification key; and
transmit to at least some of the communication elements requests that the respective communication element transmit to the respective controller information stored in the respective electronic storage device regarding an asset, and receive from the respective communication element information stored in the respective electronic storage device regarding said asset.

13. A method, comprising:
repeating a sequence comprising [1] sending from a communication element transceiver a series of broadcast signals during a time period of a first duration, followed by [2] not sending any broadcast signal from the communication element transceiver for a time period of a second duration, discontinuing said sequence upon [a] the communication element transceiver receiving from any controller a controller signal that comprises a valid identification key during a time period during which the communication element transceiver is sending a series of broadcast signals, or [b] a sensor that is attached to an asset detecting a jerking motion during said sequence, entering a mode in which the communication element performs at least one authorized function requested by a first controller, upon:

the communication element transceiver receiving from the first controller a controller signal that comprises a valid identification key during a time period during which the communication element transceiver is sending a series of broadcast signals, or the communication element transceiver receiving from the first controller a controller signal that comprises a valid identification key during a time period of a third duration starting immediately after the sensor detecting a jerking motion, said authorized functions comprising communicating to the first controller information stored in an electronic storage device regarding an asset upon such information being requested by the first controller, and exiting said mode in which the communication element performs any authorized functions requested by a first controller, and resuming said repeating of said sequence upon passage of a time period of a fourth duration during which [A] the communication element transceiver does not receive any communication from the first controller and [B] the sensor does not detect any jerking motion.

14. The method recited in claim 13, wherein at least one of the broadcast signals comprises at least some information regarding said asset.

15. The method recited in claim 14, wherein the first controller is attached to a receiving element.

16. The method recited in claim 15, wherein the receiving element is a vehicle.

17. The method recited in claim 13, wherein:
the first controller further comprises a display element, and
the method further comprises the first controller displaying on the display element information received from the communication element regarding said asset.

18. The method recited in claim 13, wherein said authorized functions further comprise changing to a different communication channel if such change is requested by the first controller.

19. A method, comprising:
for each of a plurality of communication elements that each comprises a respective communication element transceiver, a respective sensor and a respective electronic storage device, repeating a sequence comprising [1] sending from the communication element transceiver a series of broadcast signals during a time period of a first duration, followed by [2] not sending any broadcast signal from the communication element transceiver for a time period of a second duration, for each communication element in a first group of the communication elements, discontinuing said sequence upon [a] the respective communication element transceiver receiving from any controller a controller signal that comprises a valid identification key during a time period during which the communication element transceiver is sending a series of broadcast signals, or [b] the respective sensor of the communication element detecting a jerking motion during said sequence, said first group comprising at least one of said plurality of communication elements, for each of at least one communication element in the first group of communication elements, entering a mode in which the communication element performs at least one authorized function requested by a controller, upon:

the respective communication element transceiver receiving from the controller a controller signal that comprises a valid identification key during a time period during which the respective communication element transceiver is sending a series of broadcast signals, or the respective communication element transceiver receiving from the controller a controller signal that comprises a valid identification key during a time period of a third duration starting immediately after the respective sensor of the communication element detecting a jerking motion, said authorized functions comprising communicating to the controller information stored in the respective electronic storage device of the communication element regarding an asset upon such information being requested by the controller, and for each communication element that has entered said mode in which the communication element performs any authorized functions requested by a controller, exiting said mode in which the communication element performs any authorized functions requested by a controller, and resuming said repeating of said sequence upon passage of a time period of a fourth duration during which [A] the respective communication element transceiver does not receive any communication from the controller and [B] the respective sensor of the communication element does not detect any jerking motion.

* * * * *